(12) United States Patent
Kraus et al.

(10) Patent No.: US 7,813,560 B2
(45) Date of Patent: Oct. 12, 2010

(54) CLASSIFYING COMPLETE AND INCOMPLETE DATE-TIME INFORMATION

(75) Inventors: Bryan D. Kraus, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 897 days.

(21) Appl. No.: 11/679,914

(22) Filed: Feb. 28, 2007

(65) Prior Publication Data

US 2008/0205771 A1 Aug. 28, 2008

(51) Int. Cl.
*G06K 9/64* (2006.01)
*G06K 9/54* (2006.01)

(52) U.S. Cl. ...................... 382/224; 382/305

(58) Field of Classification Search .............. 382/224, 382/225, 305, 100; 358/448, 1.16, 1.18; 348/231.99, 231.5, 231.6; 707/668, 723, 707/725, 752
See application file for complete search history.

(56) References Cited

U.S. PATENT DOCUMENTS

| 6,351,556 | B1 | 2/2002 | Loui et al. | |
|---|---|---|---|---|
| 6,606,411 | B1 | 8/2003 | Loui et al. | |
| 6,636,648 | B2 * | 10/2003 | Loui et al. | 382/284 |
| 6,898,737 | B2 * | 5/2005 | Goeller et al. | 714/39 |
| 6,996,782 | B2 * | 2/2006 | Parker et al. | 715/764 |
| 2007/0236729 | A1 * | 10/2007 | Yoda | 358/1.15 |
| 2008/0062282 | A1 * | 3/2008 | Shiimori | 348/231.99 |
| 2008/0183049 | A1 * | 7/2008 | Karkanias et al. | 600/301 |

* cited by examiner

*Primary Examiner*—Yon Couso
(74) *Attorney, Agent, or Firm*—Raymond L. Owens

(57) ABSTRACT

A method for automatically classifying images into a final set of events including receiving a first plurality of images having date-time and a second plurality of images with incomplete date-time information; determining one or more time differences of the first plurality of images based on date-time clustering of the images and classify the first plurality of images into a first set of possible events; analyzing the second plurality of images using scene content and metadata cues and selecting images which correspond to different events in the first set of possible events and combining them into their corresponding possible events to thereby produce a second set of possible events; and using image scene content to verify the second set of possible events and to change the classification of images which correspond to different possible events to thereby provide the final set of events.

4 Claims, 5 Drawing Sheets

CLASSIFYING COMPLETE AND INCOMPLETE DATE-TIME INFORMATION

FIELD OF THE INVENTION

The invention relates generally to the field of image processing having image understanding that automatically classifies pictures by date-time and image content into events.

BACKGROUND OF THE INVENTION

Pictorial images are often classified by the particular event, subject or the like for convenience of retrieving, reviewing, and albuming of the images. Typically, this has been achieved by manually segmenting the images, or by the below-described automated method. The automated method includes grouping by color, shape or texture of the images for partitioning the images into groups of similar image characteristics.

Although the presently known and utilized methods for partitioning images are satisfactory, there are drawbacks. The manual classification is obviously time consuming, and the automated process, although theoretically classifying the images into events, is susceptible to miss-classification due to the inherent inaccuracies involved with classification by color, shape or texture.

U.S. Pat. No. 6,606,411 "Method for automatically classifying images into events," by Loui and Pavie sets forth an arrangement for automatically classifying images into events based on both date-time and image color content information. Although this system is quite effective, it does not take into consideration the fact that certain images of a collection can have incomplete date-time information. Incomplete date-time information includes images and video clips (i.e., content) that either contain the date, the time, a wrong date-time, or none of the above in their header or metadata portion of the content.

SUMMARY OF THE INVENTION

Briefly summarized, the present invention includes a method for automatically classifying images into events, comprising:

a. receiving a first plurality of images having date-time and a second plurality of images with incomplete date-time information;

b. determining one or more time differences of the first plurality of images based on date-time clustering of the images and classify the first plurality of images into a first set of possible events;

c. analyzing the second plurality of images using scene content and metadata cues and selecting images which correspond to different events in the first set of possible events and combining them into their corresponding possible events to thereby produce a second set of possible events;

d. using image scene content to verify the second set of possible events and to change the classification of images which correspond to different possible events to thereby provide the final set of events.

These and other aspects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of improving classification performance of images by events by including in the classification images with incomplete date-time information.

DETAILED DESCRIPTION OF THE INVENTION

Figure 1:
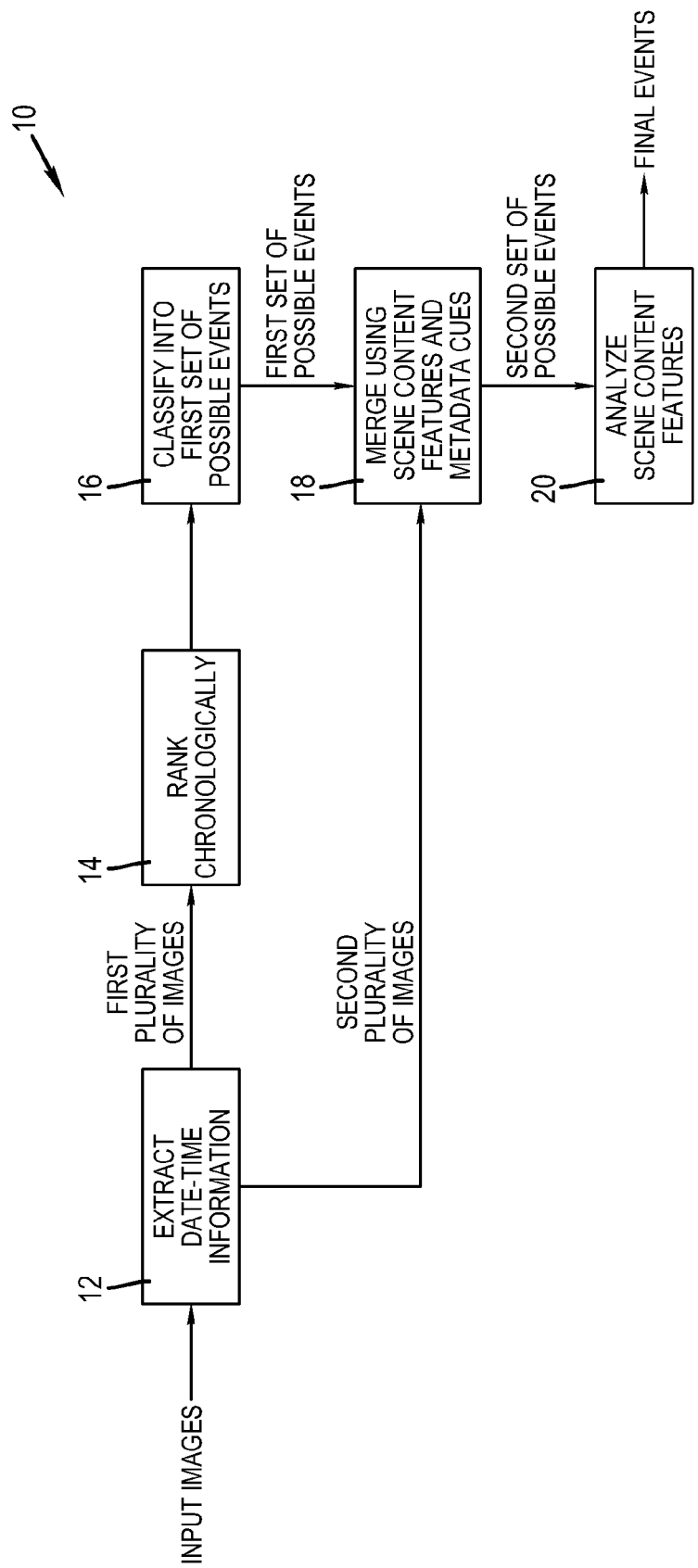
FIG. 1 is a system block diagram illustrating an overview of the present invention.

In the following description, the present invention will be described in the preferred embodiment as a software program. Those skilled in the art will readily recognize that the equivalent of such software may also be constructed in hardware. As a software program, the present invention can be used on any well-known computer system, such a personal computer. Consequently, the computer system will not be discussed in detail herein.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

The term "image" is used herein to describe a variety of multimedia objects, including still images, video, sound, and text. Images are either directly input into the computer system (for example by a digital camera) or digitized before input into the computer system (for example by scanning).

In addition, the term "event" is defined herein as a significant occurrence or happening as perceived by the subjective intent of the user of the image capture device.

The term "source directory" is used herein to describe the location of an image in storage and the organization that location implies. Source directories can be created automatically (for example, by a digital camera at capture time), or manually. They can include virtual locations (for example, on a computer file system), or physical locations (for example, a specific album of images scanned from a collection). Source directories are often hierarchical in structure. Source directories can be compared using various methods. One such method includes comparing each of the hierarchical components of the source directories and assigning a score based on the number of matching components. Using these scores, a set of "similar" source directories can be chosen, for example, based on a fixed threshold, or a threshold derived from properties of the set of scores.

The term "file name" refers to a name given to an image, often for the purposes of storage. Files names may be created automatically, or manually. File names can be compared using various methods. One such method includes comparing the character content of the names and assigning a score based on the number of shared characters. Using these scores, a set of "similar" file names can be chosen, for example, based on a fixed threshold, or a threshold derived from properties of the set of scores.

As used herein, incomplete date-time refers to capture date-time information that is missing either completely or in part (for example, date without time). It also refers to capture date-time information that was judged inaccurate. Methods for judging date-time accuracy may be manual (for example, marked by a user) or automated. Automated methods include comparing the date-time against determined thresholds, such as the manufacture date of the capture device or the current date-time, or testing multiple pieces of date-time information for consistency. The date-time of a captured image can be extracted, for example, from information available from any digital capture devices such as digital still camera, camera phone, and digital video camcorder, or from the encoded information on the film strip of the Advance Photo System (APS) images.

Referring now to FIG. 1, there is a flow diagram of a system 10 illustrating the present invention. A plurality of images is provided into an extract date-time block 12 that classifies the images into a first and second plurality of images. The first plurality of images have correct date and time information and are provided to a ranking block 14 that ranks the images chronologically according to time. The ranked plurality of images is then provided to a block 16 that creates a first plurality of possible events based on time differences using date-time information of the images using for example the method in U.S. Pat. No. 6,606,411 "Method for automatically classifying images into events," by Loui and Pavie. The second plurality of images has incomplete date-time information. In accordance with the present invention, the second plurality of images is analyzed using scene content and metadata cues provided for such images to permit the selection of images which correspond to different events in the first set of possible events and combining them into their corresponding possible events to thereby produce a second set of possible events. Metadata cues include source directory, file names, camera identification, capture information, or location information.

The second plurality of images with incomplete date-time information is provided to a block 18 that merges them with the first set of possible events to create a second set of possible events. Block 18 analyzes the metadata cues and scene content associated with the second plurality of images to produce a second set of possible events. The second set of possible events is then provided to a block 20 that uses scene content to verify the second set of possible events to produce a final set of events. This can be realized by comparing the images adjacent to the event boundaries using the method described in U.S. Pat. No. 6,606,411 "Method for automatically classifying images into events," by Loui and Pavie. Other scene content features can also be used including image similarity, image size, location, particular person(s), or clothing. Block 18 further can categorize some of the second plurality of images into events, which are different from the first set of possible events. This is accomplished by comparing images from the second plurality using a number metadata cues including the source directory of the image, the modification date of the image, and capture location of the image to that of some of the images in the first set of possible events. Images from the second plurality of images that have dissimilar metadata cues to the images from the first set of possible events are placed into possible events different from the first set of possible events to form the second set of possible events. The details of the operation in Block 18 are given in following paragraphs.

Figure 2:
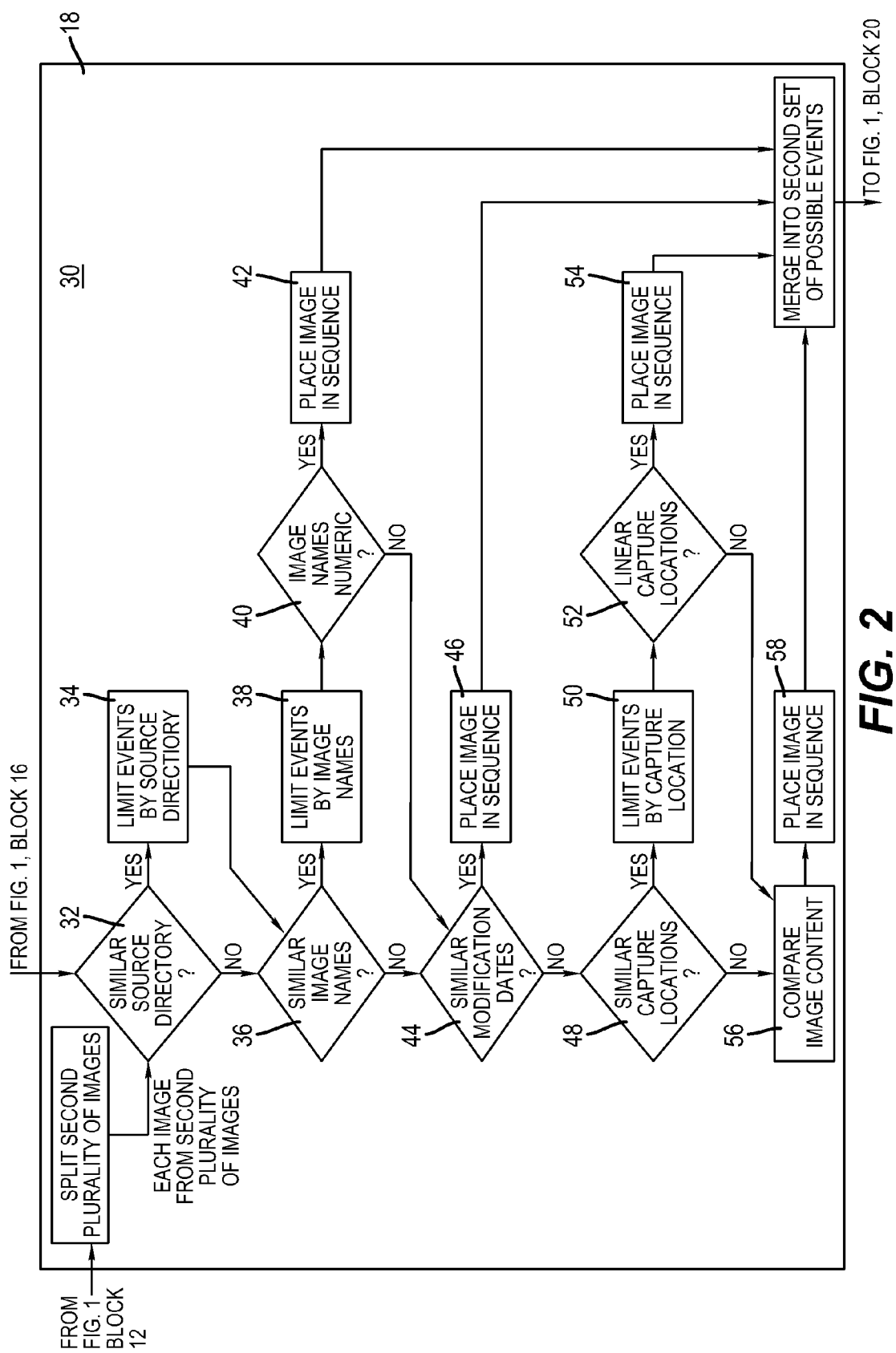
FIG. 2 is a more detailed block diagram of 18 of FIG. 1.

Referring now to FIG. 2, there is a flow diagram of a system 30 illustrating the detail of block 18 of FIG. 1. The first set of possible events and the plurality of images with incomplete date-time are provided to the system. Each image in the plurality of images is analyzed in turn according to the diagram and is placed in the second set of possible events.

One image with incomplete date-time and the full set of possible events is provided to a block 32 that compares the source directory of the image to the source directories of the images in the possible set of events. If the source directory of the image is similar to some of the images in the set of possible events the image and set of possible events are sent to a block 34, otherwise the image and set of possible events are sent to a block 36. When an image and set of possible events are provided to block 34 a subset of the set of possible events is identified that contains the images with similar source directories. The image and subset of possible events are then provided to a block 36.

Block 36 compares the name of the image with the names of the images in the subset of possible events. If the name of the image is similar to the names of some of the images in the subset of possible events the image and subset of possible events are provided to a block 38, otherwise the image and subset of possible events are provided to a block 44. When an image and subset of possible events are provided to block 38 a subset of the subset of possible events is chosen that contains the images with similar names. The chosen subset of possible events is input into a block 40 that checks if the name of the image and the names of the images in the subset of events contain numeric content. If the image names contain numeric content a block 42 places the image into the subset of possible events in the location indicated by the numeric content. If the name of the image is similar to some of the names of the images in the subset of possible events, but the names do not contain numeric content, the subset of possible events from block 38 is provided to block 44.

Block 44 compares the last modification date of the image to the last modification dates of the images from the subset of possible events. If the last modification dates are similar the image is placed in the subset of possible events based on the chronology of last modification dates (see block 46). If the last modification dates are not similar the subset of possible events is provided to a block 48.

Block 48 compares the capture location of the image to the images from the subset of possible events. The capture locations can be extracted, for example, from information available from a GPS enabled camera. If the locations are not similar the subset of possible events is provided to a block 56, otherwise the subset of possible events are provided to a block 50. Block 50 chooses a further subset of the possible events based on proximity of the capture locations of the images in the subset of possible events to the capture location of the image. The image and subset of possible events is then provided to a block 52 that checks if the image is along the path of the images from the subset of possible events. This can be determined, for example, by checking if the image capture location is near the line between images in the subset of possible events. If the image is along the path it is placed into the subset of possible events by a block 54 based on its position in the path. If the image is not along the capture location path the image and subset of possible events is provided to a block 56.

Block 56 compares the image to the images in the subset of possible events using scene content features. This can be realized using the block color histogram matching method described in U.S. Pat. No. 6,351,556 "Method for automatically comparing content of images for classification into events," by Loui and Pavie. Other scene content features can also be used such as image similarity, image size, location, particular person(s), or clothing. Image similarity can be computed by measuring the similarity of color and textual based histograms of two images and the similar ones can be grouped together as the same event. The color and texture representations and similarity can be derived from commonly-assigned U.S. Pat. No. 6,480,840 by Zhu and Mehrotra issued on Nov. 12, 2002. Image size information can be readily obtained from the metadata header of the digital image, e.g., the EXIF header of a JPEG image. Location-based feature (i.e., without GPS information) can be obtained by method described in commonly-assigned U.S. patent application U.S. Ser. No. 11/427,352 by Das, Loui, and Gallagher, filed on Jun. 29, 2006. In this case, images captured at similar location or background location can be grouped together as the same event. People related features can be computed by using automated face detection and face recognition algorithms to identify particular person(s) in an image. This can be accomplished by using U.S. Pat. No. 7,110,575 by Chen and Ray, issued on Sep. 19, 2006, and US patent application US20030210808 by Chen and Das, filed on May 10, 2002. Identifying the same people in multiple images could provide a strong probability that the images belong to the same event. Detecting clothing wore by the same person in multiple images can also be used as a clue to group images of a similar event together. This can be achieved by leverage the clothing detection method described in the commonly assigned U.S. patent application Ser. No. 11/263,156 by Gallagher, Das, and Loui filed on Oct. 31, 2005. The image is then placed in the subset of possible events by a block 58 based on its similarity to the images in the subset of the second set of possible events. Blocks 42, 54 and 58 provide inputs into block 59, which is connected to block 20 in FIG. 1.

Figure 3:
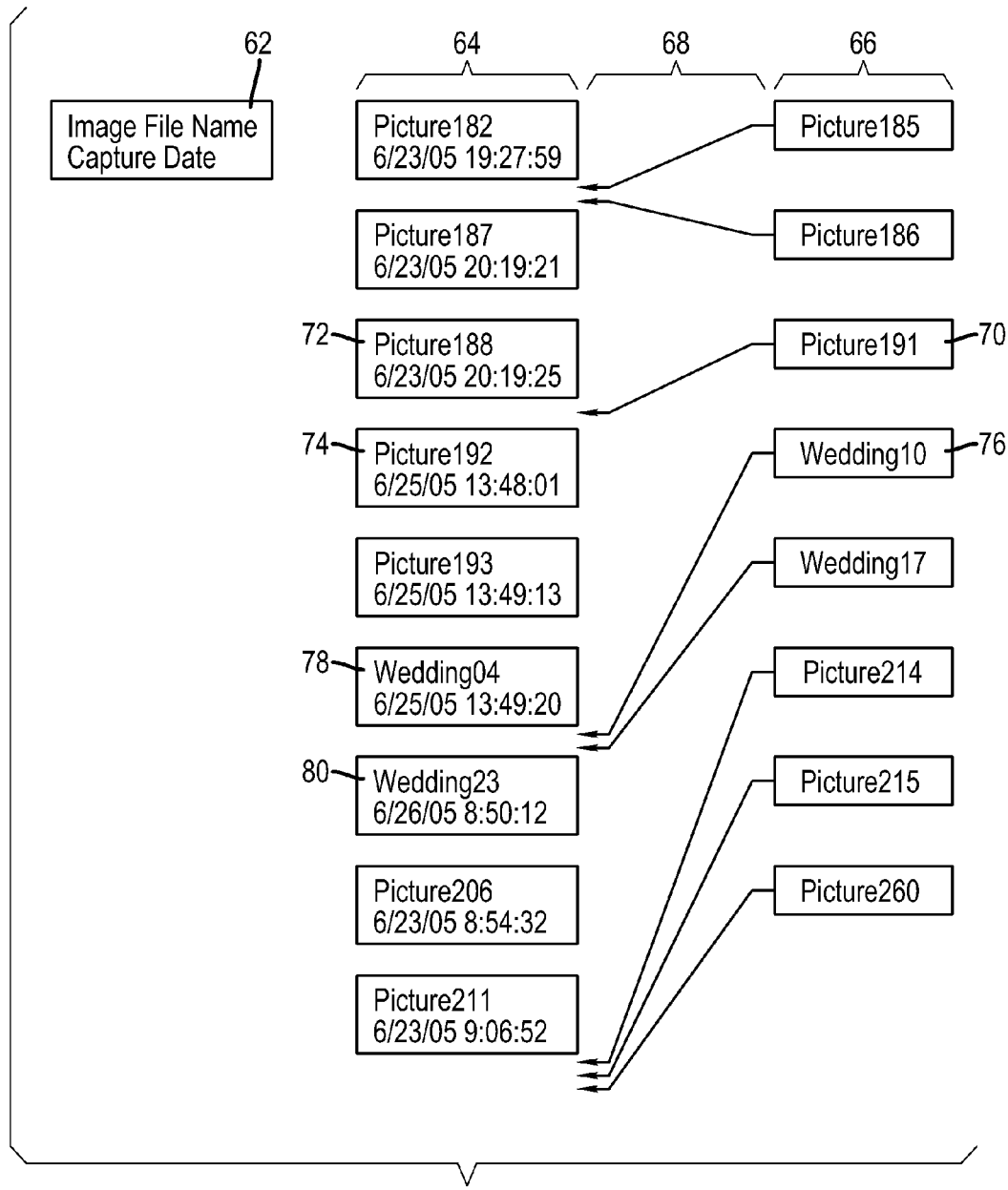
FIG. 3 is an example of the operation of block 42 of FIG. 2.

Referring now to FIG. 3, there is an example of the operation of block 42 of FIG. 2. In FIG. 3, block 62 demonstrates the format of images in the figure. The first line of each image provides the image file name; and the second line provides the image date-time. The set of images 64 have complete date-time information and are ordered by date-time. The set of images 66 have incomplete date-time information. The set of arrows 68 illustrate where each image on the right is placed in the set of images 64 based on an analysis of the alphabetic and numeric content of the file names. For example, image 70 is placed between image 72 and image 74 because the alphabetic content of the file names is the same, and because the numeric content of image 70 is between the numeric content of images 72 and 74. Similarly, image 76 is placed between image 78 and image 80 because the alphabetic content of the file names is similar, and the numeric content of image 76 is between the numeric content of images 72 and 74.

Figure 4:
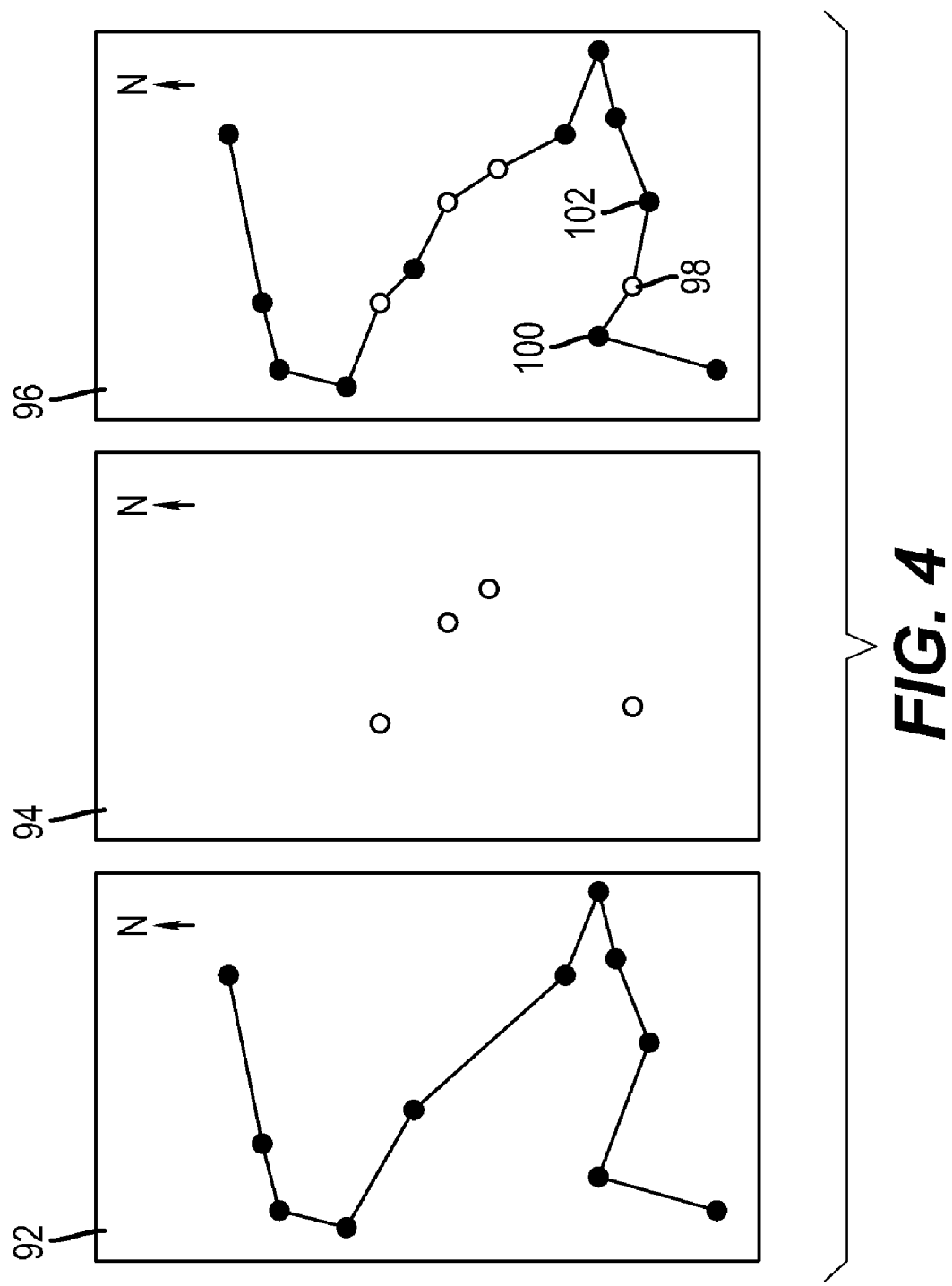
FIG. 4 is an example of the operation of block 54 of FIG. 2.

Referring now to FIG. 4, there is an example of the operation of block 54 of FIG. 2. In FIG. 4 map 92 is a geographic map showing the location of images with both capture location information and complete date-time information. The links on the map illustrate the chronological order that the images were taken. The map 94 shows the location of images with capture location information but incomplete date-time information. The map 96 illustrates how the images with incomplete date-time information are placed among the images with complete date-time information. Each image with incomplete date-time is inserted into the chronology between the images that share the link that passes closest to it.

For example, incomplete date-time image 98 is closest to the link between images 100 and 102 and is placed in the chronology between them.

Figure 5:
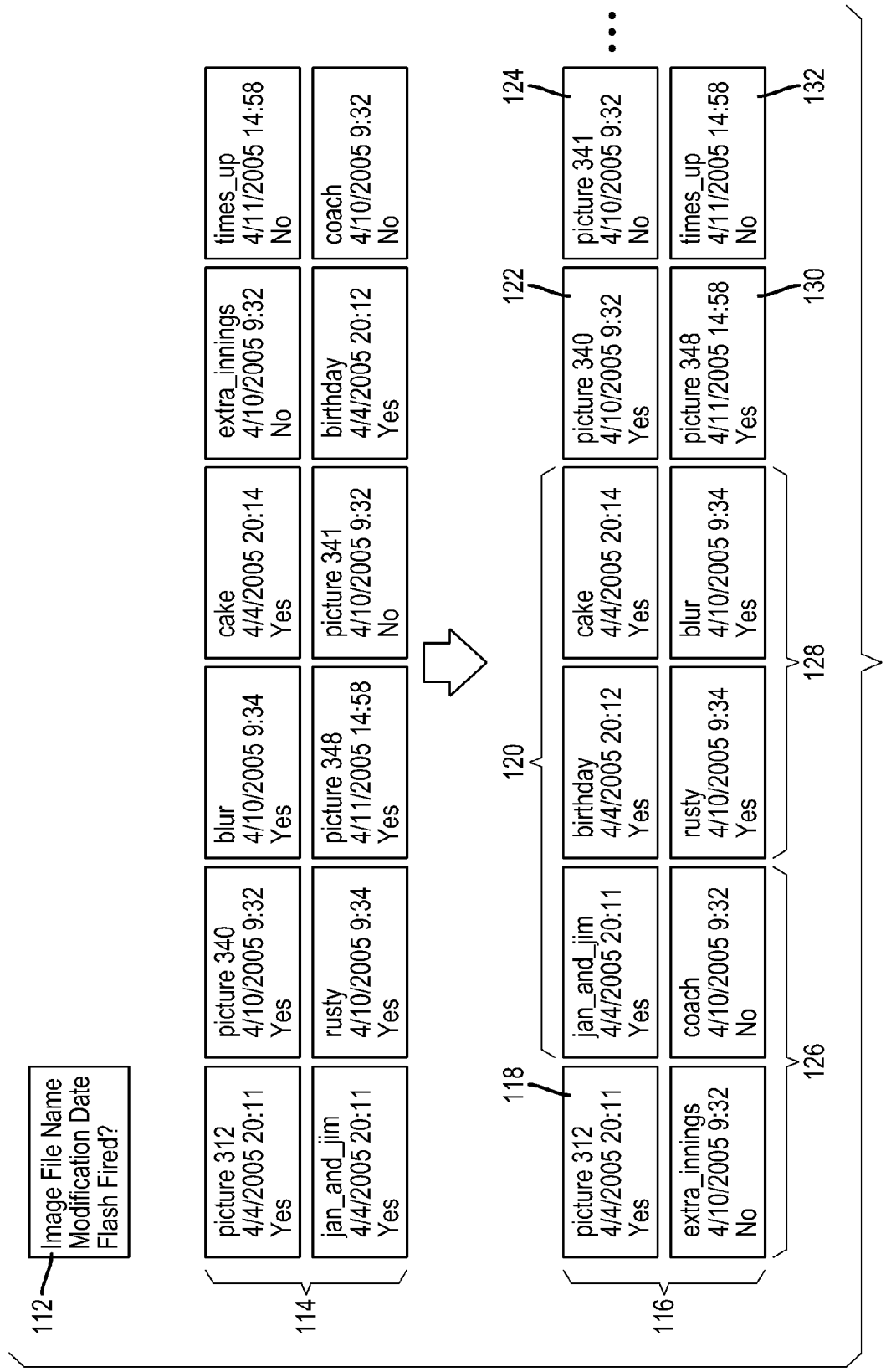
FIG. 5 is an example of the operation of block 18 of FIG. 1 given an empty first set of possible events and a second plurality of images.

Referring now to FIG. 5, there is illustrated an example of ordering incomplete date-time images using multiple sources of information as described earlier. Block 112 demonstrates the format of images in the figure. The first line of each image provides the image file name; the second line provides the modification date-time; and the third line provides an indication of whether the flash fired during capture. Whether the flash fired during capture can be retrieved, for example, from metadata stored when a digital camera captures an image. The set of images 114 represents an unordered set of input images with incomplete date-time information. The set of images 116 represents an ordering of the input images based on the file names, modification date-times, and flash fired information. Images 118, 122, 124, and 130 are ordered based on analysis of the alphabetic and numeric content of the image file names. The set of images 120 are placed adjacent to picture 118 because they share similar modification date-times, and before image 122 because their modification date-times precede the modification date-time of image 122. Image 124 is placed directly following image 122 because the numeric content of its file name sequentially follows the numeric content of the file name of image 122. The set of images 126 follows image 124 because they share the same modification date-time and flash fired value. The set of images 128 follows the set of images 126 because of the sequence of the modification date-times. Image 130 follows the set of images 128 because of the sequence of modification date-times and because the flash fired values are the same. Image 132 follows image 130 because the modification date-time is the same as image 130 and the flash fired value is different from the set of images 128 and the image 130.

The invention has been described in detail with particular reference to certain preferred embodiments thereof, but it will be understood that variations and modifications can be effected within the spirit and scope of the invention.

| PARTS LIST | |
|---|---|
| 10 | system |
| 12 | extract date-time block |
| 14 | block |
| 16 | block |
| 30 | system |
| 32 | block |
| 34 | block |
| 36 | block |
| 38 | block |
| 40 | block |
| 42 | block |
| 44 | block |
| 46 | block |
| 48 | block |
| 50 | block |
| 52 | block |
| 54 | block |
| 56 | block |
| 58 | block |
| 62 | block |
| 64 | set of images |
| 66 | set of images |
| 68 | arrows |
| 70 | image |
| 72 | image |
| 74 | image |
| 76 | image |
| 78 | image |
| 80 | image |

-continued

PARTS LIST

| | |
|---|---|
| 92 | image |
| 94 | image |
| 96 | image |
| 98 | image |
| 100 | image |
| 102 | image |
| 112 | image |
| 114 | image |
| 116 | image |
| 118 | image |
| 120 | image |
| 122 | image |
| 124 | image |
| 128 | image |
| 130 | image |
| 132 | image |

The invention claimed is:

1. A method for automatically classifying images into a final set of events, comprising using a computer system to automatically perform the following steps:
  a. using the computer system to receive a first plurality of images having date-time and a second plurality of images with incomplete date-time information;
  b. using the computer system to determine one or more time differences of the first plurality of images based on date-time clustering of the images and classify the first plurality of images into a first set of possible events;
  c. using the computer system to analyze the second plurality of images using scene content and metadata cues and selecting images which correspond to different events in the first set of possible events and combining them into their corresponding possible events to thereby produce a second set of possible events;
  d. using the computer system to use image scene content to verify the second set of possible events and to change the classification of images which correspond to different possible events to thereby provide the final set of events.

2. The method of claim 1 wherein step c further includes categorizing some of the second plurality of images into events, which are different from the first set of possible events.

3. The method of claim 1 wherein the metadata cues includes, source directory, file names, camera identification, capture information, or location information.

4. The method of claim 1 wherein the image scene content includes, image similarity, image size, location, particular person(s), or clothing.

* * * * *